(12) United States Patent
Miyama et al.

(10) Patent No.: US 12,377,913 B2
(45) Date of Patent: Aug. 5, 2025

(54) DRIVER ASSIST SYSTEM FOR VEHICLE

(71) Applicant: TOYOTA JIDOSHA KABUSHIKI KAISHA, Toyota (JP)

(72) Inventors: Keigo Miyama, Toyota (JP); Shintaro Saigo, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 111 days.

(21) Appl. No.: 18/523,454

(22) Filed: Nov. 29, 2023

(65) Prior Publication Data

US 2024/0270311 A1 Aug. 15, 2024

(30) Foreign Application Priority Data

Feb. 10, 2023 (JP) .................................. 2023-018885

(51) Int. Cl.
| | |
|---|---|
| B62D 15/02 | (2006.01) |
| B60W 10/20 | (2006.01) |
| B60W 30/12 | (2020.01) |
| B60W 40/105 | (2012.01) |
| G06V 20/56 | (2022.01) |

(52) U.S. Cl.
CPC ........... *B62D 15/025* (2013.01); *B60W 10/20* (2013.01); *B60W 30/12* (2013.01); *B60W 40/105* (2013.01); *G06V 20/588* (2022.01); *B60W 2420/403* (2013.01); *B60W 2540/18* (2013.01); *B60W 2552/53* (2020.02)

(58) Field of Classification Search
CPC ...... B62D 6/00; B62D 15/024; B62D 15/025; B60W 30/12; B60W 2540/18; B60W 2710/207
See application file for complete search history.

(56) References Cited

U.S. PATENT DOCUMENTS

| | | | | |
|---|---|---|---|---|
| 10,000,237 | B2 * | 6/2018 | Katoh | B60W 30/12 |
| 11,225,192 | B2 * | 1/2022 | Xu | G08G 1/167 |
| 11,814,099 | B2 * | 11/2023 | Omikawa | B60W 50/0097 |
| 2002/0156580 | A1 * | 10/2002 | Matsuura | B60T 8/17558 |
| | | | | 701/41 |
| 2018/0350242 | A1 * | 12/2018 | Fujii | B60W 30/18163 |
| 2020/0156700 | A1 * | 5/2020 | Shiraishi | B62D 5/0463 |

(Continued)

FOREIGN PATENT DOCUMENTS

JP 2011-118828 A 6/2011

*Primary Examiner* — John Kwon
(74) *Attorney, Agent, or Firm* — Sughrue Mion, PLLC

(57) ABSTRACT

A driver assist system for avoiding hunting of an assist control. The driver assist system comprises: an edge line detector that detects edge lines of a predetermined lane; a limit steering angle detector that detects a limit steering angle at which a vehicle reaches the edge line in a predetermined time; an actual steering angle detector that detects an actual steering angle from a reference position; a comparator that compares the actual steering angle with the limit steering angle; a steering assistor that establishes a steering reaction force when the actual steering angle exceeds the limit steering angle; a determiner that determines a satisfaction of a condition relating to a lane width; and an adjustor that imaginarily sets the right edge line and the left edge line on the center of the lane, and calculate the limit steering angle based on the imaginary edge line upon the satisfaction of the condition.

8 Claims, 11 Drawing Sheets

(56) References Cited

U.S. PATENT DOCUMENTS

2022/0063718 A1\* 3/2022 Kobayashi ............ B62D 5/0463
2024/0336299 A1\* 10/2024 Hamada ............. B60W 30/0956
2024/0359740 A1\* 10/2024 Saigo ................... B62D 15/025

\* cited by examiner

DRIVER ASSIST SYSTEM FOR VEHICLE

CROSS-REFERENCE TO RELATED APPLICATIONS

The present disclosure claims the benefit of Japanese Patent Application No. 2023-018885 filed on Feb. 10, 2023 with the Japanese Patent Office, the disclosure of which is incorporated herein by reference in its entirety.

BACKGROUND

Field of the Invention

The present disclosure relates to a system that assists a driver to operate a vehicle based on a traveling environment or a traveling condition, and more particularly, to a system that assists a driver to operate a steering device so as to maintain the vehicle within a lane.

Discussion of the Related Art

Since an unnecessary lane change during propulsion involves a risk, it is preferable for the vehicle to keep the current lane. However, roads are not always straight, and some roads are inclined in the width direction. Therefore, the driver has to control a traveling direction of the vehicle in accordance with the road condition. In order to lighten a burden on a driver to operate a steering device according to a road condition, various driver assist systems have been developed to automatically control a steering force or a steering reaction force.

One example of the driver assist system is described in JP-A-2011-118828. The driver assist system described in JP-A-2011-118828 is configured to detect edge lines on both left and right sides of the vehicle, and to shift from the non-assist mode to the assist mode when the vehicle approaches the edge line within a predetermined distance. In addition, the driver assist system maintains the non-assist mode in a case that the edge line is detected only on one of the left and right sides and the distance from the edge line is equal to or longer than a predetermined distance. For this purpose, the driver assist system establishes a steering assist force in a direction of returning the vehicle to the center of the lane every time the vehicle approaches the edge line.

According to the teachings of JP-A-2011-118828, when the vehicle is expected to deviate from the lane, the driver is assisted to steer the vehicle by applying the steering assist force to a steering wheel so as to maintain the position of the vehicle to the center of the lane. Specifically, when the vehicle moves away from the center of the lane and approaches the edge line, the steering assist force is applied to the steering wheel in a direction of returning the vehicle to the center of the lane. For example, in a case that a width of the lane is somewhat wider than the width of the vehicle, the steering assist force will not be applied to the steering wheel even if the vehicle slightly deviates from the center of the lane in the width direction. By contrast, in a case that the width of the lane is close to the width of the vehicle, a determination that the vehicle approaches the edge line or the vehicle will deviate from the edge line is made immediately when the vehicle slightly deviates from the center of the lane in one of the width directions, and the steering assist force is applied to the steering wheel. In this case, the vehicle is returned to the center of the lane by rotating the steering wheel in the direction of application of the steering assist force, and then the steering assist force is cancelled. However, in the narrow lane, the steering assist force is applied to the steering wheel in a direction opposite to the previous direction even when the vehicle moves slightly from the center of the lane toward the other side in the width direction. That is, in the narrow lane, the steering assist force is generated and cancelled frequently and repeatedly. In addition, the operation mode is frequently shifted between the assist mode and the non-assist mode. As a result, the operation of the steering wheel and the application of the steering reaction force to the steering wheel are alternately repeated in both directions. Therefore, the driver is required to operate the steering wheel more than necessary due to hunting.

SUMMARY

Aspects of embodiments of the present disclosure have been conceived noting the foregoing technical problems, and it is therefore an object of the present disclosure to provide a driver assist system configured to avoid repetition of execution and interruption of the assist control to maintain the vehicle within a lane during propulsion in a narrow lane.

According to the exemplary embodiment the present disclosure, there is provided a driver assist system for a vehicle that assists a driver to steer the vehicle so as to prevent deviation of the vehicle from a predetermined lane. In order to achieve the above-explained objective, according to the embodiment of the present disclosure, a controller for controlling a steering force comprises: an edge line detector that detects a right edge line and a left edge line of the predetermined lane on which the vehicle travels; a limit steering angle detector that detects a right limit steering angle at which the vehicle reaches the right edge line in a predetermined time given that the vehicle travels at a current speed, and a left limit steering angle at which the vehicle reaches the left edge line in the predetermined time given that the vehicle travels at the current speed; an actual steering angle detector that detects an actual steering angle as an operating amount from a position at which the vehicle propels straight ahead; a comparator that compares the actual steering angle with the right limit steering angle and the left limit steering angle; a steering assistor that establishes a steering reaction force when the actual steering angle exceeds the right limit steering angle or the left limit steering angle, in a direction to reduce a difference between the actual steering angle and the right limit steering angle or the left limit steering angle exceeded by the actual steering angle; a determiner that determines a satisfaction of a predetermined condition relating to a width of the predetermined lane; and an adjustor that imaginarily sets the right edge line and the left edge line on a center of the predetermined lane in a width direction, and calculate the right limit steering angle and the left limit steering angle based on the right edge line and the left edge line set imaginarily so as to establish the steering reaction force by the steering assistor, when the satisfaction of the predetermined condition is determined by the determiner.

In a non-limiting embodiment, the predetermined condition may include any of: a fact that a deviation between the right limit steering angle and the left limit steering angle is equal to or less than a predetermined threshold value; and a fact that the width of the predetermined lane on which the vehicle travels is narrower than a predetermined width.

In a non-limiting embodiment, the driver assist system may further comprise a steering device that is operated to turn the vehicle. In addition, a position of the steering device at which the vehicle propels straight ahead may correspond to zero degree. An operating amount of the steering device in a direction to turn the vehicle in one of a right direction and a left direction may be expressed as a positive amount, and the operating amount of the steering device in a direction to turn the vehicle in other one of the right direction and the left direction may be expressed as a negative amount. The actual steering angle, the right limit steering angle, and the left limit steering angle may correspond to the operating amount of the steering device.

In a non-limiting embodiment, the steering assistor may be configured to establish the steering reaction force corresponding to an excess amount of the actual steering angle over the right limit steering angle or the left limit steering angle.

In a non-limiting embodiment, the determiner may be configured to determine the satisfaction of the predetermined condition when the right limit steering angle is changed to an angle to turn the vehicle in the left direction while the vehicle travels on the center of the predetermined lane in an extending direction of the predetermined lane, and when the left limit steering angle is changed to an angle to turn the vehicle in the right direction while the vehicle travels on the center of the predetermined lane in the extending direction of the predetermined lane.

According to the present disclosure, the limit steering angle at which the vehicle traveling within a predetermined lane reaches the right or left edge line in a predetermined time is calculated. When the vehicle travels in the center of the lane, the left and right limit steering angles are equalized to each other. Whereas, if the vehicle comes close to one of the right and left edge lines, one of the right and left limit steering angles is reduced smaller than the other one of the right and left limit steering angles. The actual steering angle corresponds to a rotational angle of the steering wheel from a reference angle (0 degrees) at which the vehicle propels straight ahead. When the actual steering angle exceeds one of the right and left limit steering angles, the steering reaction force is applied to the steering wheel in a direction in which a difference between the actual steering angle and the limit steering angle is reduced. Thus, the driver is assisted to steer the vehicle in such a manner that the vehicle will not approach the edge line or deviate from the lane.

Further, when the predetermined condition relating to the width of the lane is satisfied, for example, when the difference between the right limit steering angle and the left limit steering angle becomes equal to or less than a predetermined threshold value, or when the lane is narrow, the right edge line and the left edge line are imaginarily drawn as one line in the center of the lane in the width direction. The right limit steering angle and the left limit steering angle are calculated based on the imaginary edge line, and the steering reaction force is controlled by the steering assistor based on the limit steering angle and the actual steering angle. That is, in a situation where the vehicle travels along the imaginary edge line drawn at the center of the narrow lane, the limit steering angle and the actual steering angle coincide with each other. In this situation, therefore, the steering assist control for generating the steering reaction force is not executed. Whereas, when the vehicle is oriented away from the imaginary edge line, a predetermined limit steering angle is calculated. In this situation, since the vehicle is oriented away from the imaginary edge line, the actual steering angle has already exceeded the limit steering angle. Therefore, the steering reaction force is established by the steering assistor to return the vehicle to the center of the lane (i.e., to the site where the imaginary edge line is drawn). Thus, when the vehicle traveling in the center of the lane is oriented away from the imaginary edge line by slightly turning the steering wheel, the steering reaction force is applied to the steering wheel in the direction of returning the vehicle to the imaginary edge line. As a result, hunting of the vehicle behavior and the assist control can be prevented.

Further, according to the present disclosure, the steering reaction force is established in accordance with an amount of the actual steering angle in excess of the limit steering angle. Therefore, the driver is allowed to sense the approach of the vehicle to the edge line and the urgency of necessity to avoid deviation from the lane, from the steering force to rotate the steering wheel. For this reason, the driver is allowed to easily operate the steering wheel in such a manner as to prevent the deviation of the vehicle from the lane. In addition, the difference between the right steering reaction force and the left steering reaction force or the difference between the tight steering force and the left steering force is eliminated when traveling on the narrow road. Therefore, the driver is allowed to operate the steering wheel without feeling strangeness.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Hereinafter, embodiments of the present disclosure will be explained with reference to the accompanying drawings. Note that the embodiments described below are merely examples of the present disclosure, and the present disclosure is not limited thereto.

Figure 1:
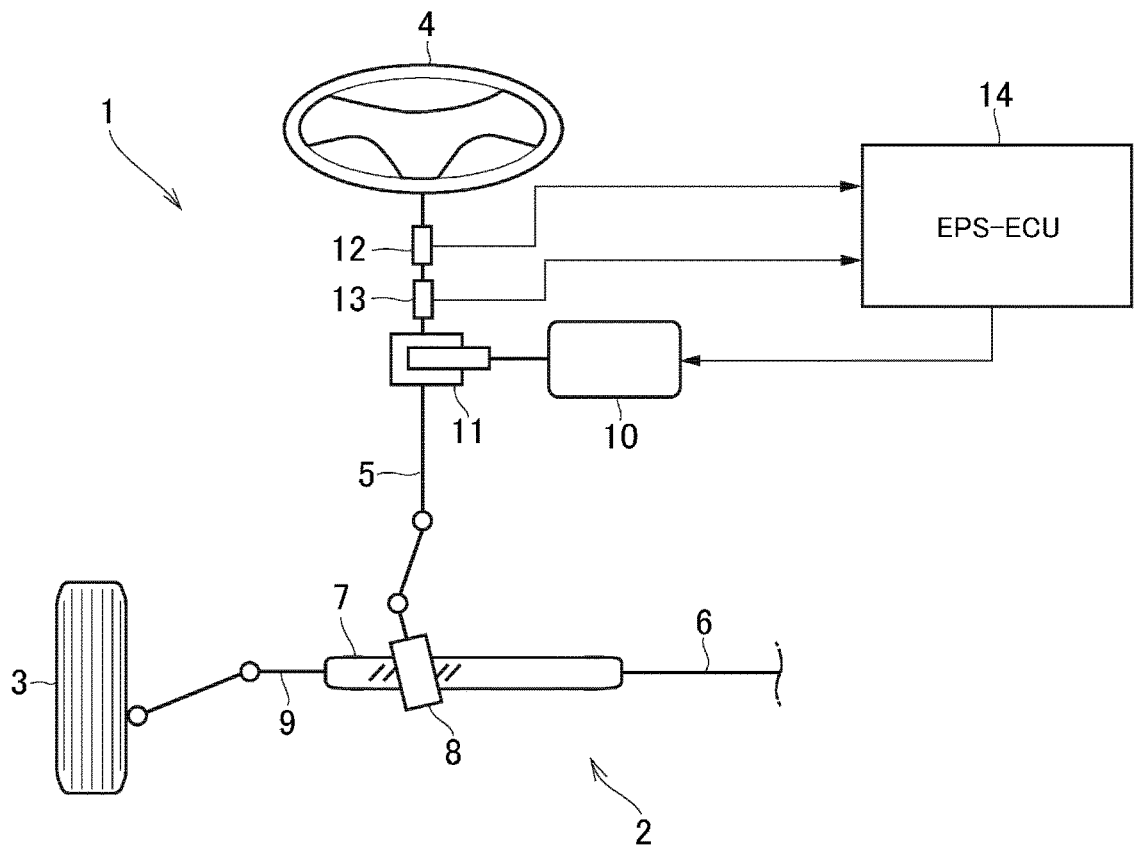
FIG. 1 is a schematic diagram illustrating one example of an electric power steering system according to the present disclosure.

The driver assist system according to the embodiment of the present disclosure is configured to assist a driver to change a steering angle, and more specifically, to adjust a steering force (or steering torque) to avoid a deviation of a vehicle from a lane. For example, an electric power steering system (hereinafter, abbreviated as "EPS") may be employed as a steering device, and a steering torque of the EPS 1 may be electrically controlled. A structure of the EPS 1 is schematically shown in FIG. 1.

The EPS 1 is mounted on a vehicle 2 and is configured to steer the steered wheels 3 as e.g., front wheels, in order to change an orientation of the vehicle 2 (that is, to turn the vehicle 2). To this end, the EPS 1 is provided with a steering wheel 4 that serves as an operating device for operating the EPS 1. The steering wheel 4 is connected to a steering linkage 6 via a steering shaft 5, and the steered wheels 3 are turned in accordance with a rotational angle of the steering wheel 4. The steering linkage 6 includes a rack 7 that reciprocates in the width direction of the vehicle 2, a pinion 8 that meshes with the rack 7, and a tie rod 9 that connects the rack 7 to the steered wheels 3. The steering shaft 5 is connected to the pinion 8 of the steering linkage 6. Accordingly, when the steering wheel 4 is rotated in either direction, the pinion 8 is rotated thereby moving the rack 7 in the width direction so that the steered wheels 3 are turned in the rotational direction of the steering wheel 4. In the embodiment of the present disclosure, a steering angle of a case in which the steering wheel 4 is positioned at a neutral position to propel the vehicle 2 straight ahead is designated as "0 degree". Further, an amount of rotation in the left direction from the neutral position of the steering wheel 4 corresponds to the "positive" steering angle, and an amount of rotation in the right direction from the neutral position of the steering wheel 4 corresponds to the "negative" steering angle. Therefore, the steering angle is increased by rotating the steering wheel 4 to turn the vehicle 2 to the left, and the steering angle is decreased by rotating the steering wheel 4 to turn the vehicle 2 to the right.

A motor 10 is provided to assist the driver to rotate the steering wheel 4. The motor 10 is adapted to apply torque or power to the steering wheel 4, the steering shaft 5, or the rack 7. In the example shown in FIG. 1, the motor 10 is connected to a steering shaft 5 via a speed reducer 11. The EPS1 further comprises a torque sensor 12 for detecting a steering torque, and a steering angle sensor 13 for detecting a steering angle. The detection signals of the torque sensor 12 and the steering angle sensor 13 are transmitted to an electronic control unit (EPS-ECU) 14 of the EPS 1. The EPS-ECU14 is mainly composed of a microcomputer, and a vehicle speed signal, an after-mentioned control command signal from the controller and so on are also transmitted to the EPS-ECU14. The EPS-ECU14 is configured to perform calculation using the incident data and the data stored in advance, and to rotate the motor 10 in the forward rotation direction or the reverse rotation direction based on the result of the calculation. That is, the EPS-ECU14 is configured to establish a steering torque in a direction to assist the steering wheel 4 to rotate, and to establish a steering torque (steering reaction force) in a direction to restrict the rotation of the steering wheel 4.

Figure 2:
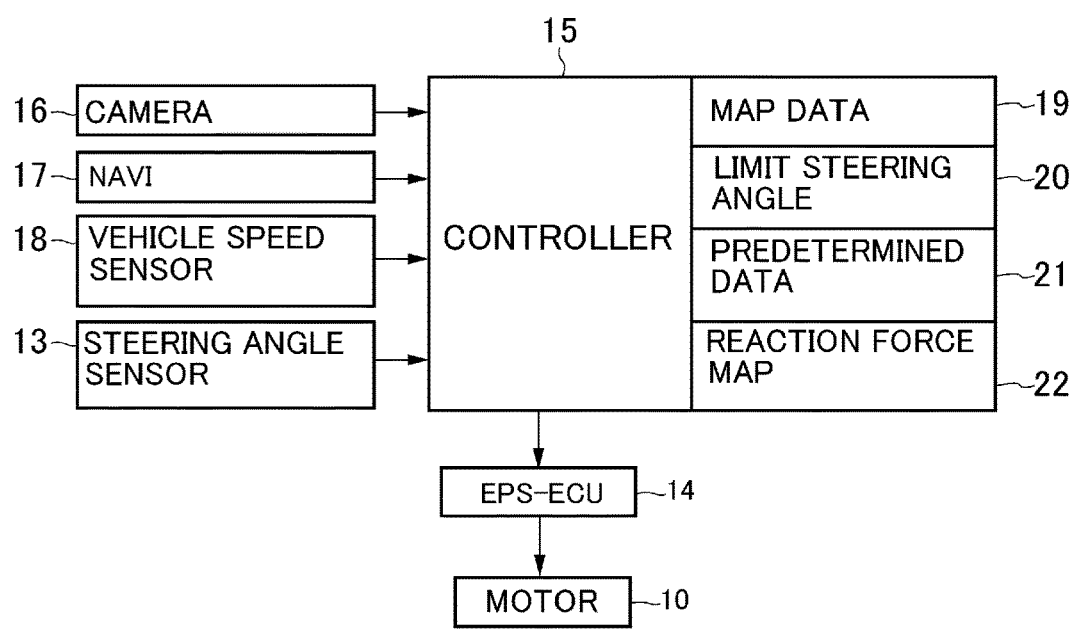
FIG. 2 is a block diagram showing functions of the driver assist system according to the embodiment of the present disclosure.

The EPS 1 is provided with a controller 15 configured to assist the driver to operate the steering wheel 4 in such a manner that the vehicle 2 will not deviate from the lane. The controller 15 is an electronic control unit mainly composed of a microcomputer including a storage element (RAM, ROM), an arithmetic element (CPU), an input/output interface, and so on. As shown in FIG. 2, the controller 15 is configured to perform a calculation using incident data and data stored in advance, and to transmit a calculation result to the EPS-ECU14 in the form of control command signal. For example, the controller 15 receives image data from a camera 16 that photographs a front view and a peripheral view of the vehicle 2, positional data from a navigation system (NAVI) 17, data about a vehicle speed from a vehicle speed sensor 18 mounted on the vehicle 2, data about an actual steering angle detected by the steering angle sensor 13 and so on.

The image data captured by the camera 16 includes edge lines of the lane on which the vehicle 2 is currently traveling, and a relative position between the vehicle 2 and each of the edge line is obtained based on the image data. If the edge line is not clearly captured by the camera 16, the edge line may also be identified using an artificial intelligence (AI). Further, the relative position among the current position of the vehicle 2 and the left and right edge lines may also be obtained by combining the positional information obtained by the navigation system 17 with an after-mentioned map data.

For example, in the controller 15, the map data 19 in which facility information such as road information is associated with a coordinate position employed in the navigation system 17, left and right limit steering angle data 20, reference value data 21 for determining a distance between left and right assist control starting positions governed by the left and right limit steering angles, reaction force map 22 in which the magnitude of the steering reaction force is determined in accordance with a deviation between the actual steering angle and the limit steering angle etc., are stored in advance.

Figure 3:
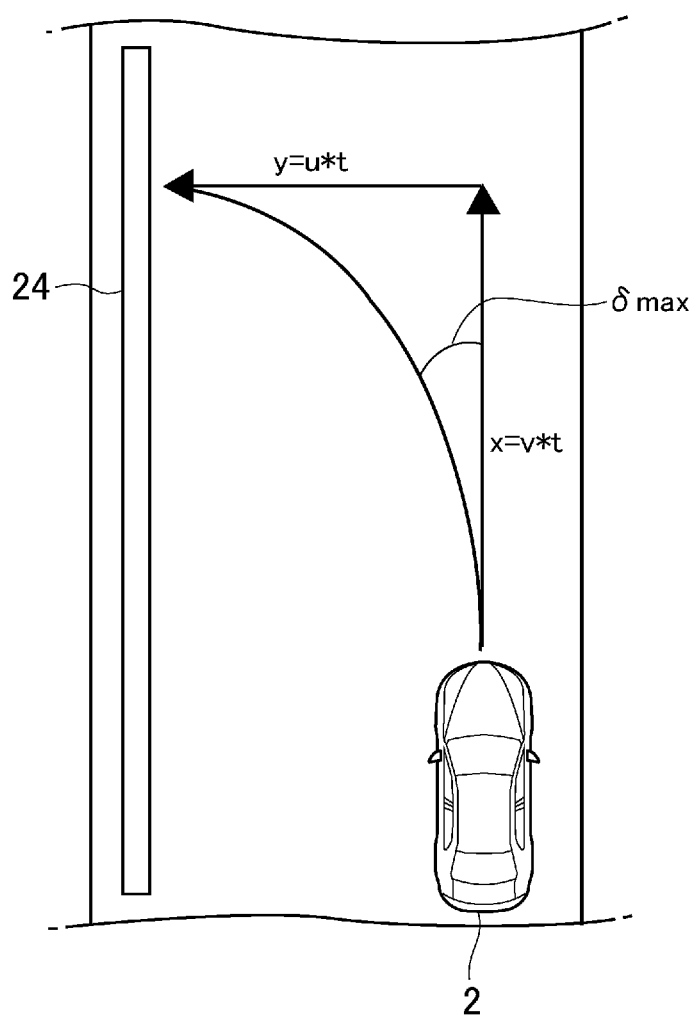
FIG. 3 is an illustration showing the limit steering angle according to the embodiment of the present disclosure.

Note that the limit steering angle according to the embodiment of the present disclosure is a steering angle at which the vehicle 2 reaches the edge line in a predetermined time (hereinafter, also referred to as a "read-ahead time") at the current vehicle speed. For example, when the steering wheel 4 is rotated in one of the left and right directions, the vehicle 2 travels along a curve having a turning radius (or curvature) corresponding to the actual steering angle of the steering wheel 4. As illustrated in FIG. 3, given that a speed component in the traveling direction of the vehicle 2 is v, a distance x to a position in the traveling direction of the vehicle 2 after the predetermined read-ahead time t from a time point at which the vehicle 2 started turning may be expressed as:

$$x = v \cdot t.$$

Whereas, given that a speed component in the width direction (lateral direction) of the vehicle 2 is u, a distance y to a position in the lateral direction of the vehicle 2 after the predetermined read-ahead time t from the time point at which the vehicle 2 started turning may be expressed as:

$$y = u \cdot t.$$

The steering angle at which the lateral distance y coincides with the current distance between the vehicle 2 and the edge line is a limit steering angle δmax. Given that the vehicle 2 travels at a certain speed level and therefore an expected steering angle of the steering wheel 4 is small, the limit steering angle δmax may be approximately expressed as:

$$\delta\max = \sin^{-1}(y/x).$$

In addition, a relationship between a curvature of a road and a steering angle such as a vehicle motion equation of a clearance circle is known in the art. Therefore, it is also possible to calculate the limit steering angle by calculating a curvature based on the relationship between the above-mentioned x and y. As described above, according to the embodiment of the present disclosure, the angle in the left direction from the neutral position of the steering wheel 4 is a positive angle, and the angle in the right direction from the neutral position of the steering wheel 4 is a negative angle.

As described above, the limit steering angle changes according to the vehicle speed, and decreases with a reduction in the distance from the edge line to the vehicle 2. Therefore, the limit steering angle with respect to the vehicle speed may be determined and stored in advance. Instead, the limit steering angle may also be calculated based on the detected vehicle speed and a width of the lane. In addition, since the edge lines are drawn on both left and right sides of the vehicle 2, the limit steering angle is obtained in each of the left and right directions. For example, when the vehicle 2 travels along the center of the lane in a direction parallel to the lane, the left and right limit steering angles are equal to each other. However, when the vehicle 2 travels near the left or right edge line of the lane, the limit steering angle on the side of the edge line closer to the vehicle 2 is reduced smaller than the limit steering angle on the opposite side. Further, even if the vehicle 2 is positioned at the center of the lane but the vehicle 2 is headed to the left or right, the limit steering angle on the side of the edge line to which the vehicle 2 is headed is reduced smaller than the limit steering angle on the opposite side.

Figure 4:
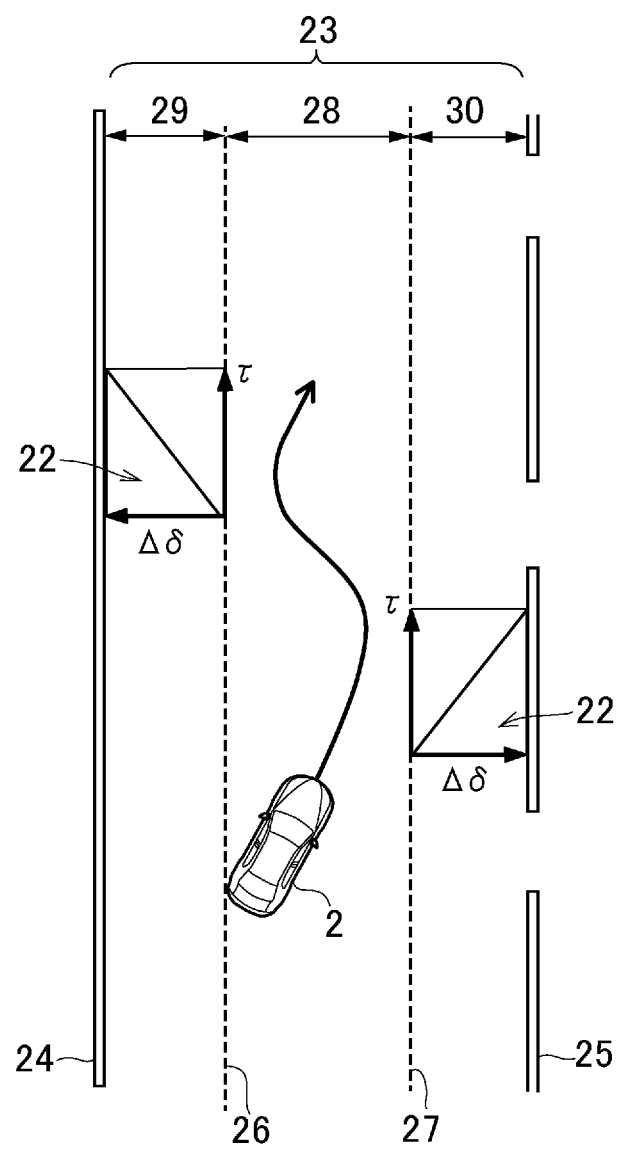
FIG. 4 is an illustration showing the steering assist control on a wide road.

In order to prevent the vehicle 2 from approaching the edge line or deviating from the lane, the steering reaction force is established when the actual steering angle exceeds the limit steering angle δmax. For example, if the distance between the position of the vehicle 2 and the edge line after the read-ahead time t is longer than the distance y in the lateral direction by which the current limit steering angle δmax is governed, this means that the current actual steering angle does not exceed the limit steering angle δmax. In this case, therefore, the steering reaction force is not established. By contrast, if the vehicle 2 approaches the edge line or headed to the edge line, the vehicle 2 will reach the edge line within the read-ahead time t. That is, in this case, the current actual steering angle exceeds the limit steering angle δmax. Therefore, the steering reaction force is established in accordance with the actual steering angle (i.e., a difference between the limit steering angle δmax and the actual steering angle δ). The position of the vehicle 2 at which the control for generating the steering reaction force is started is determined by the distance from the edge line. In FIG. 4, the positions of the vehicle 2 at which the assist control for generating the steering reaction force is started are indicated by broken lines. Specifically, in FIG. 4, reference numeral 23 denotes the lane, reference numeral 24 denotes the edge line on the left side (road shoulder side), reference numeral 25 denotes the edge line on the right side (not shown center line side), reference numeral 26 denotes an assist control starting position on the left side, and reference numeral 27 denotes an assist control starting position on the right side. A region between the left assist control starting position 26 and the right assist control starting position 27 is an ineffective region 28 in which the steering reaction force for assisting the steering operation is not generated. In addition, a region between the left assist control starting position 26 and the left edge line 24 is a left execution region 29 in which the steering reaction force for assisting the steering operation is generated, and a region between the right assist control starting position 27 and the right edge line 25 is a right execution region 30 in which the steering reaction force for assisting the steering operation is generated.

Specifically, the steering reaction force is an assist torque for changing an orientation of the vehicle 2 in a direction to prevent the vehicle 2 from approaching the edge line 24 or 25, or deviating from the lane 23. For example, the steering reaction force may be set to a predetermined constant value. According to the embodiment of the present disclosure, however, the steering reaction force is increased with an increase in a difference between the actual steering angle and the limit steering angle in a situation where the actual steering angle exceeds the limit steering angle. The difference between the actual steering angle and the limit steering angle is increased not only with an increase in the actual steering angle but also with a reduction in the limit steering angle. For example, when the vehicle 2 is traveling near one of the edge lines 24 and 25 and the steering wheel 4 is further rotated in the direction toward said one of the edge lines, the difference between the actual steering angle and the limit steering angle is increased by an increase in the actual steering angle. Whereas, when the vehicle 2 approaches one of the edge lines 24 and 25 and consequently the above-explained lateral distance y is decreased, the difference between the actual steering angle and the limit steering angle is increased by a reduction in the limit steering angle δmax, even if the actual steering angle is not changed. In the two-dimensional reaction force map 22 shown in FIG. 4, the horizontal axis represents a deviation Δδ (=limit steering angle−actual steering angle), and the vertical axis represents a steering reaction force (assist torque) τ. As shown in the reaction force map 22, the assist torque τ is increased in proportion to an increase in the deviation Δδ of the steering angles. Although only the right reaction force map 22 is shown in FIG. 4, the reaction force map 22 is also prepared on the left side in the same manner.

If a width of the lane 23 is sufficiently wider than a width of the vehicle 2, a width of the ineffective region 28 is wider than the width of the vehicle 2. In this case, regions where the steering assistance control is not executed are created on both left and right sides of the vehicle 2 as long as the vehicle 2 travels in the center of the lane 23. By contrast, if a width of the lane 23 is narrow, the distance between the left assist control starting position 26 and the right assist control starting position 27, that is, the width of the ineffective region 28 may be equal to or narrower than a predetermined value. In this case, the width of the ineffective region 28 is reduced close to or narrower than the width of the vehicle 2.

In addition, the left execution region 29 and the right execution region 30 may overlap on each other thereby eliminating the ineffective region 28. When the steering wheel 4 is slightly rotated to the right or left while traveling on such a narrow road and consequently the vehicle 2 passes over the assist control starting position 26 (or 27), the steering assist control is commenced to generate the steering reaction force (i.e., the assist torque) in the direction of returning the steering wheel 4. Such steering assist control is executed in both right and left directions, and the steering wheel 4 is returned by the steering reaction force so that the vehicle 2 is turned to a direction opposite to the prior direction. Eventually, since the vehicle 2 is traveling on a narrow road, the actual steering angle exceeds the limit steering angle δmax, and the steering reaction force is generated again to return the steering wheel 4 in the opposite direction. The controller 15 is configured to adjust the limit steering angle δmax to avoid such hunting of the steering assist control. For this purpose, the right edge line and the left edge line are imaginarily drawn as one line on the center of the lane 23 in the width direction upon satisfaction of a predetermined condition. For example, the right edge line and the left edge line are imaginarily unified and drawn as one line on the center in the width direction of the lane 23 in a case that the vehicle 2 travels in the vicinity of the center of the lane 23 and hence the difference between the right limit steering angle Rδmax and the left limit steering angle Lδmax (i.e., a sum of absolute values if those values are positive and negative) is smaller than or equal to the threshold value, or in a case that a width of the lane 23 is equal to or narrower than a predetermined width. Thereafter, the right limit steering angle Rδmax and the left limit steering angle Lδmax are calculated based on the imaginary edge line.

Figure 5:
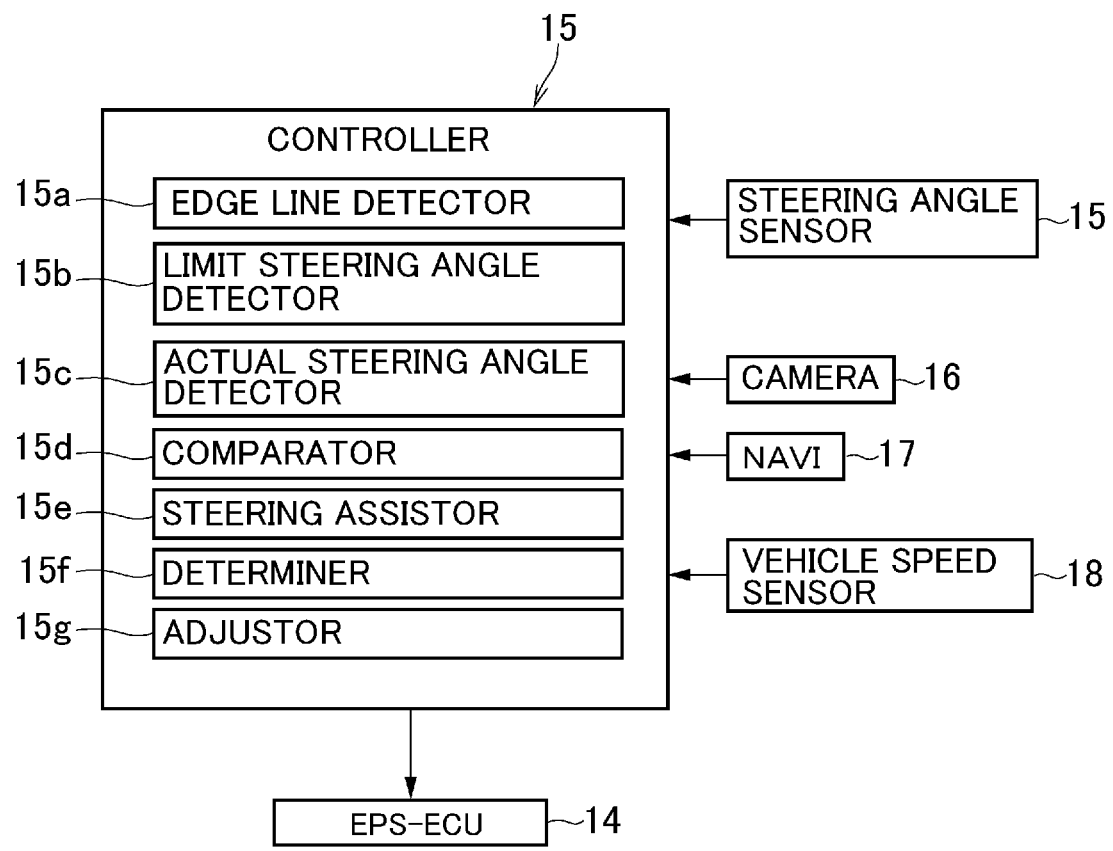
FIG. 5 is a block diagram showing a structure of a controller.

In order to perform the above-explained steering assist control including the control of the steering reaction force and the adjustment of the limit steering angle δmax, the controller 15 comprises functional means shown in FIG. 5. As illustrated in FIG. 5, the controller 15 comprises an edge line detector 15a that detects the right edge line 25 and the left edge line 24 of the lane 23 on which the vehicle 2 travels. For example, the edge lines 24 and 25 may be detected based on the image data collected by the camera 16. Specifically, positions of the edge lines 24 and 25 may be specified on a coordinate system created around the vehicle 2 as a coordinate origin, or on a map created based on information and map data obtained by the navigation system 17.

The controller 15 further comprises a limit steering angle detector 15b that detects the limit steering angle δmax. As described above, the limit steering angle δmax is a steering angle at which the vehicle 2 reaches the edge line 24 or 25 in the predetermined read-ahead time t at the current speed. As the actual steering angle, for example, the limit steering angle δmax is expressed as a steering amount of the steering wheel 4. Specifically, the limit steering angle δmax is an angle from the reference steering position So (i.e., 0 degree) as the neutral position of the steering wheel 4 at which the vehicle 2 travels straight ahead. As described above, in the embodiment being described, the left direction corresponds to the positive angle and the right direction corresponds to the negative angle. Therefore, the limit steering angle is increased in the leftward direction from the reference steering position So, and reduced in the rightward direction from the reference steering position So. The positional relation among the vehicle 2 and the edge lines 24 and 25 may be detected by the navigation system 17 or the edge line detector 15a, and the vehicle speed may be detected by the vehicle speed sensor 18. In addition, the read-ahead time t is set in advance. Therefore, the limit steering angle δmax may be calculated using the above-mentioned equation (δmax=sin$^{-1}$(y/x)), or using the turning curvature obtained based on the vehicle motion equation of a clearance circle. Specifically, both of the left limit steering angle Lδmax for the case of turning the vehicle 2 to the left and the right limit steering angle Rδmax for the case of turning the vehicle 2 to the right are calculated. Further, in order to indicate directions of the limit steering angles Lδmax and Rδmax, the left limit steering angle Lδmax is expressed as a positive angle, and the right limit steering angle Rδmax is expressed as a negative angle.

The controller 15 further comprises an actual steering angle detector 15c. The actual steering angle δ is an amount of rotation of the steering wheel 4 from the reference steering position So, and may be detected by the steering angle sensor 13. In the case that the steering wheel 4 is turned to the left, the actual steering angle δ is detected as a positive actual steering angle δ. By contrast, in the case that the steering wheel 4 is turned to the right, the actual steering angle δ is detected as a negative actual steering angle δ.

The controller 15 further comprises a comparator 15d that compares the actual steering angle δ with the limit steering angle δmax, and a steering assistor 15e that establishes a steering reaction force based on the comparison result. The comparator 15d detects whether or not the actual steering angle δ of the steering wheel 4 turned to the left exceeds the left limit steering angle Lδmax, and whether or not the actual steering angle δ of the steering wheel 4 turned to the right exceeds the right limit steering angle Rδmax. In addition, the comparator 15d detects a difference between the actual steering angle δ of the case in which the steering wheel 4 is turned to the left and left limit steering angle Lδmax, and a difference between the actual steering angle δ of the case in which the steering wheel 4 is turned to the right and the right limit steering angle Rδmax. When the actual steering angle δ exceeds the limit steering angle δmax, the steering assistor 15e generates the steering reaction force (i.e., the assist torque) in a direction to reduce the steering angle of the steering wheel 4. In other words, the steering reaction force is generated in a direction to reduce the difference between the actual steering angle δ and the limit steering angle δmax. For example, when the actual steering angle δ exceeds the left limit steering angle Lδmax by turning the steering wheel 4 to the left, a steering reaction force in the right direction is generated so as to return the steering wheel 4 to the right. By contrast, when the actual steering angle δ exceeds the right limit steering angle Rδmax by turning the steering wheel 4 to the right, the steering reaction force in the left direction is generated so as to return the steering wheel 4 to the left. The steering reaction force (i.e., the assist torque) may be set to a predetermined constant value. Instead, the steering reaction force may also be set in accordance with the deviation Δδ of the steering angle. In this case, the left assist torque Lt to be generated may be expressed as:

$$L\tau = K(L\delta\text{max}\delta);$$

and
the right assist torque Rτ to be generated may be expressed as:

$$R\tau = K(R\delta\text{max}\delta).$$

The coefficient K in the above equation may be not only a constant number, but also be a variable determined according to a vehicle speed or the like.

In most cases, the left edge line 24 and the right edge line 25 are drawn on the lane 23, and the left limit steering angle Lδmax and the right limit steering angle Rδmax are always detected while the vehicle 2 is running. As described above, the steering reaction force is applied to the steering wheel 4 when the actual steering angle δ exceeds the limit steering angle δmax. For example, when the actual steering angle δ is increased larger than the left limit steering angle Lδmax by rotating the steering wheel 4 to the left (Lδmax<δ), the left assist torque Lτ (=K(Lδmax−δ)) is calculated to reduce the difference between the actual steering angle δ and the left limit steering angle Lδmax. Likewise, when the actual steering angle δ is reduced smaller than the right limit steering angle Rδmax by rotating the steering wheel 4 to the right (δ<Rδmax), the right assist torque Rτ (=K(Rδmax-o)) is calculated to reduce the difference between the actual steering angle δ and the right limit steering angle Rδmax. Given that the actual steering angle δ is equal to or less than the left limit steering angle Lδmax and equal to or greater than the right limit steering angle Rδmax (Rδmax≤δ≤Lδmax), this means that the vehicle 2 is positioned within the ineffective region 28. In this case, therefore, the assist torques Lτ and Rτ will not be established (Lτ, Rτ=0). As described above, the amount of rotation of the steering wheel 4 in the leftward direction from the reference steering position So is expressed as a positive angle, and the amount of rotation of the steering wheel 4 in the rightward direction from the reference steering position So is expressed as a negative angle. Therefore, the above-mentioned relationships between the actual steering angle δ and the left limit steering angle Lδmax and the right limit steering angle Rδmax are expressed based on such expression of angles.

As described above, the actual steering angle δ is changed by rotating the steering wheel 4, the left limit steering angle Lδmax is changed by a change in the distance between the vehicle 2 and the left edge line 24, and the right limit steering angle Rδmax is changed by a change in the distance between the vehicle 2 and the right edge line 25. As a result, the deviation Δδ between the actual steering angle δ and the limit steering angle δmax, and the left assist torque Lτ and the right assist torque Rτ based thereon are changed by the above-mentioned changes.

The limit steering angle δmax is increased with an increase in the clearance between the vehicle 2 and the edge line 24 or 25 (the above-described distance y). Therefore, even if the vehicle 2 travels along the center of the lane 23 and the actual steering angle δ is equal to or less than the limit steering angle δmax, the vehicle 2 will eventually approaches any one of the edge lines 24 and 25 as long as the actual steering angle δ is maintained, and consequently the limit steering angle δmax is reduced. As a result, even if the actual steering angle δ is not changed, the actual steering angle δ exceeds the limit steering angle δmax, and the assist torque τ is generated. In this situation, a position away from the edge line 24 or 25 by the distance y based on the limit steering angle δmax is set as the assist control starting position.

The controller 15 further comprises a determiner 15f that determines whether or not a predetermined condition relating to the width of the lane 23 is satisfied. Specifically, the determiner 15f is configured to determine whether the vehicle 2 is traveling in the vicinity of the center of the lane 23, and whether the lane 23 on which the vehicle 2 is traveling is narrow. Such determinations may be made by calculating a deviation between the left limit steering angle Lδmax and the right limit steering angle Rδmax which are sequentially calculated, and comparing the calculated deviation with a predetermined threshold value. Instead, such determinations may also be made by calculating a distance between the left edge line 24 and the right edge line 25 based on the data relating to the left edge line 24 and the right edge line 25, and comparing the calculated distance with a predetermined value. Further, such determinations may also be made by comparing the distance between the left assist control starting position 26 and the right assist control starting position 27 with a predetermined value. The predetermined value used for such determination may be set in advance based on the width of the vehicle 2 or the like.

The ineffective region 28 is also set in the lane determined as a narrow lane. However, the lane determined as a narrow lane includes a lane in which the width of the ineffective region 28 is narrow, and a lane in which the left execution region 29 and the right execution region 30 partially overlap on each other thereby eliminating the ineffective region 28. When the vehicle travels on any of those narrow lanes, the steering assistance control is commenced to establish the steering reaction force even by a slight change in the actual steering angle δ. Therefore, the steering assistance control is executed frequently and repeatedly. In order to avoid such control hunting, the controller 15 further comprises an adjustor 15g that adjusts the limit steering angle δmax. As will be described later, the adjustor 15g is configured to calculate the left limit steering angle Lδmax and the right limit steering angle Rδmax on the basis of the right edge line and the left edge line unified into one line and imaginarily drawn in the center of the lane 23. Consequently, the left limit steering angle Lδmax and the right limit steering angle Rδmax adjusted by the adjustor 15g are equalized to each other. In this case, the left assist control starting position 26 and the right assist control starting position 27 coincide with the center of the lane 23. In this situation, when the steering wheel 4 is slightly rotated from the reference steering position So to the right or left, the actual steering angle δ exceeds the limit steering angle δmax. Consequently, the steering reaction force is established in a direction opposite to the rotational direction of the steering wheel 4. As a result, the steering angle or the steering position is maintained to the reference steering position So, and hence the vehicle 2 will not be turned to the left and right repeatedly due to such control hunting.

Figure 6:
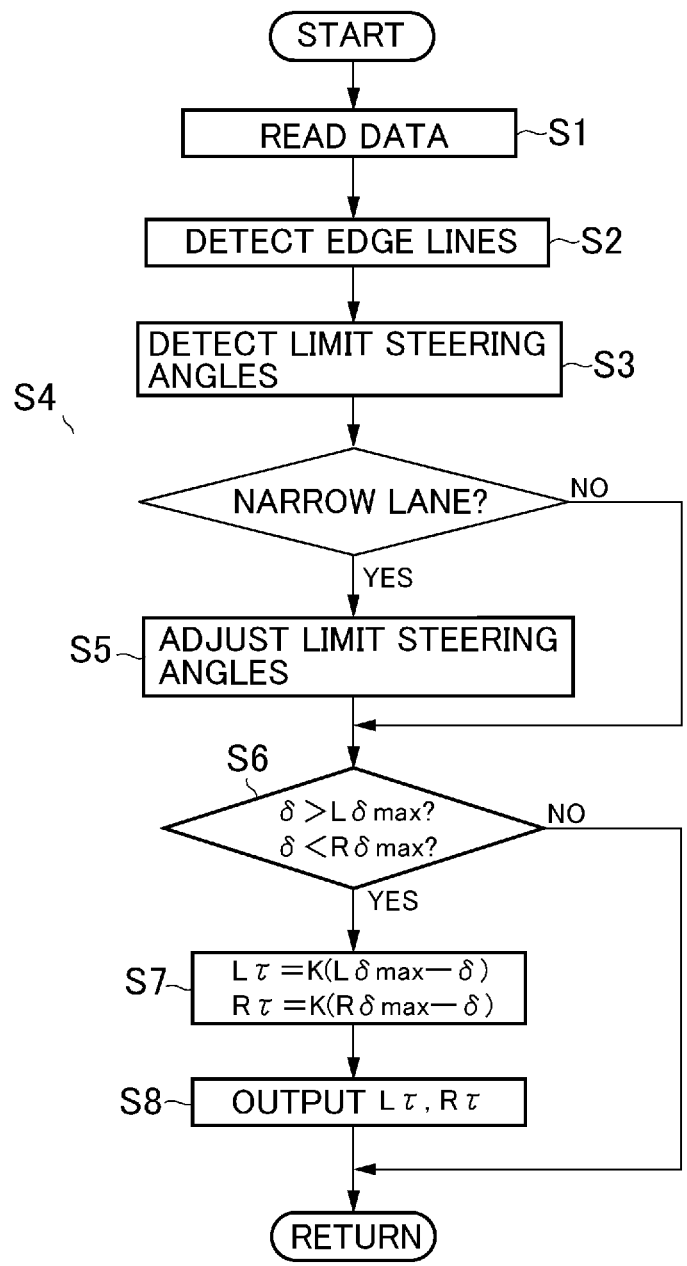
FIG. 6 is a flowchart showing one example of the steering assist control according to the embodiment of the present disclosure.

Next, an example of the steering assist control executed by the controller 15 will be described with reference to a flowchart shown in FIG. 6. First, at step S1, the controller 15 reads the data transmitted thereto. As described above, the image data around the vehicle 2 including the edge lines 24 and 25, the data about the vehicle speed, the positional data of the vehicle 2, the data about the steering angle, the reaction force map etc., are transmitted to the controller 15. At step S2, the left edge line 24 and the right edge line 25 are detected based on the incident data to the controller 15. At step S2, specifically, positions of the left edge line 24 and the right edge line 25 on the map, or a relative position of the vehicle 2 with respect to the edge lines 24 and 25 is/are detected. At step S3, the left limit steering angle Lδmax and the right limit steering angle Rδmax are detected on the basis of the data about the edge lines 24 and 25, the data about the vehicle speed, the predetermined read-ahead time t, and so on.

Then, it is determined at step S4 whether or not a predetermined condition is satisfied in the current running condition of the vehicle 2. Specifically, the determiner 15f determines whether or not the condition for adjusting the detected left limit steering angle Lδmax and right limit steering angle Rδmax is satisfied. That is, at step S4, it is determined whether or not a predetermined condition relating to the width of the lane 23 is satisfied. More specifically, it is determined whether the deviation between the left limit steering angle Lδmax and the right limit steering angle Rδmax (i.e., a sum of absolute values of the left limit steering angle Lδmax and the right limit steering angle Rδmax) is equal to or less than a predetermined threshold value, or whether the width of the lane 23 is equal to or less than a predetermined width. Such determination at step S4 may be made based on the left limit steering angle Lδmax, the right limit steering angle Rδmax, the width of the lane 23, and so on. Instead, in order to make such determination at step S4, the left assist control starting position 26 may be determined based on the left edge line 24 and the left limit steering angle Lδmax, and the right assist control starting position 27 may be determined based on the right edge line 25 and the right limit steering angle Rδmax. In this case, the determination at step S4 may be made by comparing the distance between the left assist control starting position 26 and the right assist control starting position 27 with a predetermined reference value.

If the answer of step S4 is YES, the routine progresses to step S5 to adjust the left limit steering angle Lδmax and the right limit steering angle Rδmax. Specifically, the imaginary edge line is set at the center of the lane 23 in the width direction, and the left limit steering angle Lδmax and the right limit steering angle Rδmax are calculated based on the imaginary edge line. As a result, the left limit steering angle Lδmax and the right limit steering angle Rδmax are set to the same angle. In addition, the left assist control starting position 26 and the right assist control starting position 27 are set at the same position such as the center of the lane 23. Consequently, the ineffective region 28 is eliminated, and the left execution region 29 is set on the left side of the center of the lane 23 and the right execution region 30 is set on the right side of the center of the lane 23.

Thereafter, it is determined at step S6 whether or not any of the left and right actual steering angles δ is larger than the left limit steering angle Lδmax or smaller than the right limit steering angle Rδmax. That is, it is determined whether the absolute value of each actual steering angle exceeds the left and right limit steering angles. If the answer of step S4 is NO, the routine progresses directly to step S6.

If the actual steering angle δ exceeds the limit steering angle δmax so that the answer of step S6 is YES, the routine progresses to step S7 to calculate the steering reaction force (i.e., the assist torque). For example, if the actual steering angle δ in the leftward direction exceeds the left limit steering angle Lδmax, the left steering reaction force Lτ is calculated by multiplying the deviation between the actual steering angle δ and the left limit steering angle Lδmax by a predetermined coefficient K. Specifically, the left steering reaction force Lτ is a torque acting in a direction to reduce the difference between the actual steering angle δ and the left limit steering angle Lδmax, and the steering wheel 4 is rotated to the right by the left steering reaction force Lt. By contrast, if the actual steering angle δ in the rightward direction exceeds the right limit steering angle Rδmax, the right steering reaction force (right assist torque) Rτ is calculated by multiplying the deviation between the actual steering angle δ and the right limit steering angle Rδmax by the predetermined coefficient K. Specifically, the right steering reaction force Rτ is a torque acting in a direction to reduce the difference between the actual steering angle δ and the right limit steering angle Rδmax, and the steering wheel 4 is rotated to the left by the right steering reaction force Rt.

Thus, when the (absolute value of) actual steering angle δ exceeds any one of the left limit steering angles Lδmax and the right limit steering angle Rδmax, the left steering reaction force Lτ or the right steering reaction force Rτ is calculated at step S7. Then, at step S8, the controller 15 transmits a control command signal to the EPS-ECU14 so that the steering reaction force Lτ or Rτ is applied to EPS1 or the steering wheel 4. Thereafter the routine returns.

If the actual steering angle δ does not exceed the left limit steering angle Lδmax and the right limit steering angle Rδmax so that the answer of step S6 is NO, the routine returns.

Figure 7:
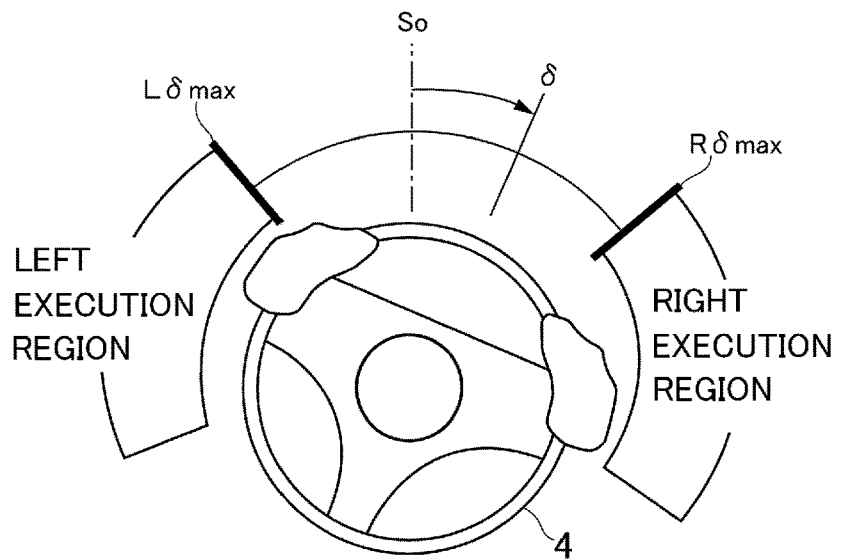
FIG. 7 is an illustration for explaining details of the steering assist control on a wide road and a reaction force map used in the steering assist control.
Figure 7:
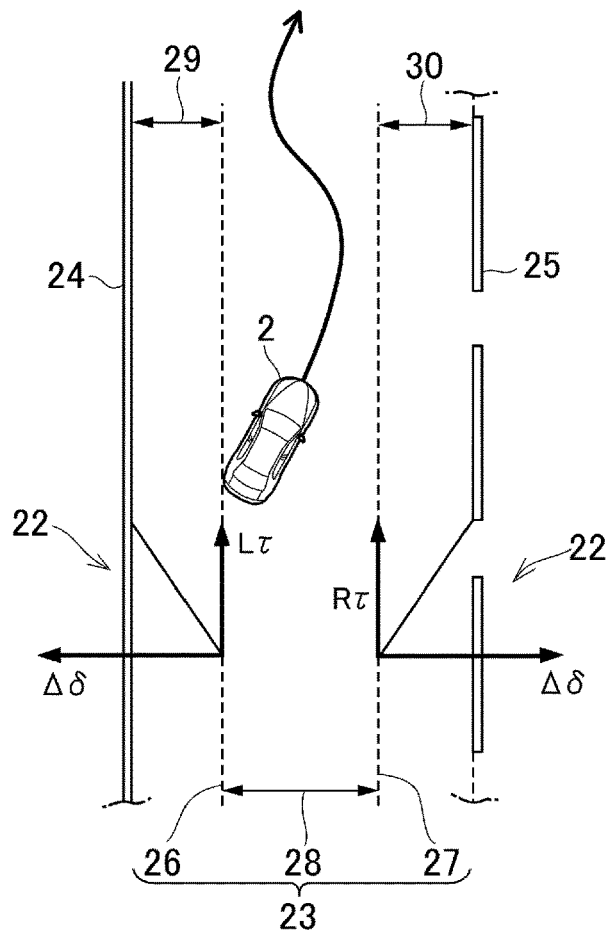

Next, here will be explained a behavior of the vehicle 2 and the steering reaction force to be established during execution of the steering assist control. FIG. 7 shows an example in which the vehicle 2 is traveling on a wide road. In this case, since the width of the lane 23 is sufficiently wider than the width of the vehicle 2, the ineffective region 28 is maintained sufficiently, and the left limit steering angle Lδmax and the right limit steering angle Rδmax from the neutral position of the steering wheel 4 are set to large angles. Therefore, even when the steering wheel 4 is rotated slightly thereby changing the actual steering angle δ and consequently the limit steering angle δmax is changed slightly by a change in the orientation of the vehicle 2, the vehicle 2 remains within the ineffective region 28. In this situation, therefore, the steering reaction force will not be established immediately. In the normal situation, the driver operates the vehicle 2 in such a manner as to travel along the center of the lane 23. When the vehicle 2 comes close to the left edge line 24 or the right edge line 25, the driver rotates the steering wheel 4 to steer the vehicle 2 toward the center of the lane 23. In the example illustrated in FIG. 7, therefore, the vehicle 2 travels within the ineffective region 28 as indicated by the wavy line, and the steering reaction force is not applied to the steering wheel 4. That is, the vehicle 2 travels in accordance with the operation of the steering wheel 4 performed by the driver.

Figure 8:
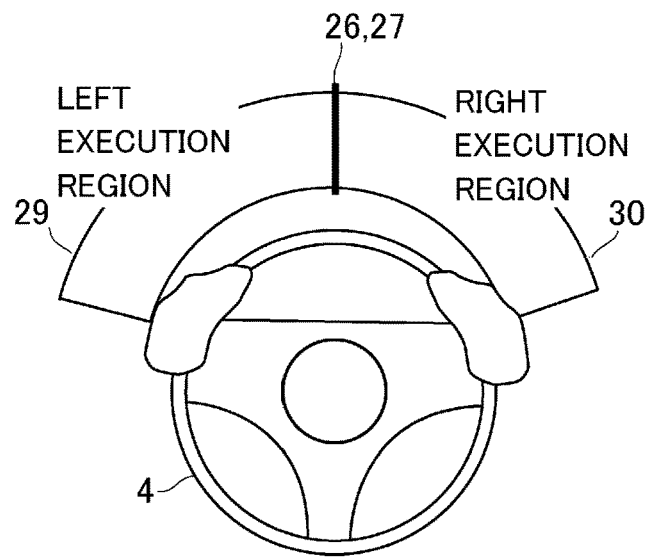
FIG. 8 is an illustration for explaining details of the steering assist control on a narrow road and a reaction force map used in the steering assist control.
Figure 8:
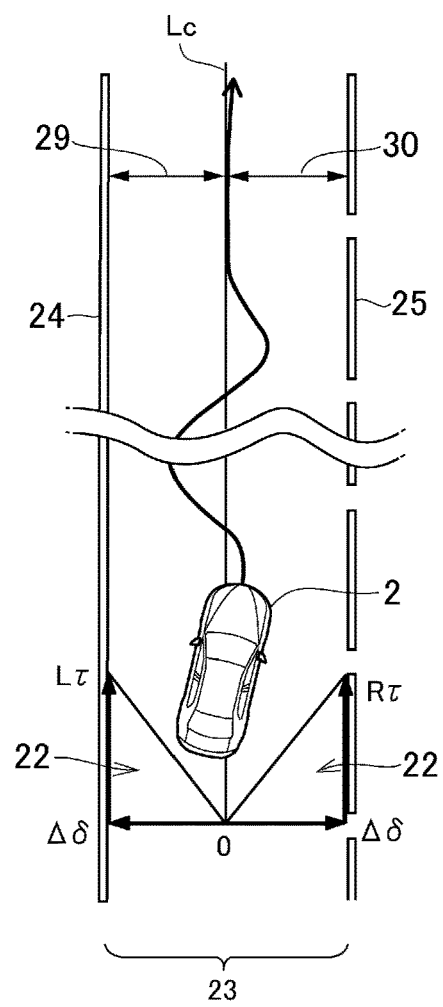

FIG. 8 shows an example in which the vehicle 2 is traveling on a narrow road. As described above, the left limit steering angle Lδmax and the right limit steering angle Rδmax are calculated based on the vehicle speed and the read-ahead time etc., and the left assist control starting position 26 and the right assist control starting position 27 are set in accordance with the left limit steering angle Lδmax and the right limit steering angle Rδmax. In the example illustrated in FIG. 8, since the width of the lane 23 is narrow, the distance between the left assist control starting position 26 and the right assist control starting position 27 (that is, the width of the ineffective region 28) is reduced as narrow as the width of the vehicle 2. Therefore, the vehicle 2 passes over the assist control starting position 26 or 27 and the steering reaction force is generated every time the vehicle 2 slightly deviates from the center of the lane 23 to the left or right, unless the left limit steering angle Lδmax and the right limit steering angle Rδ are adjusted at step S5 of the routine shown in FIG. 6. In order to avoid such disadvantage, in the narrow road, the limit steering angle δmax is adjusted based on the imaginary edge line drawn on the center of the lane 23. As a result, the left limit steering angle Lδmax and the right limit steering angle Rδmax are equalized to each other, and the left assist control starting position 26 and the right assist control starting position 27 are set on the same position such as the center of the lane 23. In this case, the ineffective region 28 is eliminated, the left execution region 29 is set on the left side of the center of the lane 23, and the right execution region 30 is set on the right side of the center of the lane 23.

As can be seen from the right and left reaction force maps 22 shown in FIG. 8, the larger steering reaction force t is applied to the steering wheel 4 with an increase in deviation of the vehicle 2 from the center of the lane 23. In FIG. 8, reference numeral "Lc" denotes the imaginary edge line. For example, when the vehicle 2 is traveling along the center of the lane 23 while being oriented slightly to the right with respect to an extending direction of the lane 23 (i.e., the imaginary edge line Lc), the limit steering angle δmax is calculated based on the imaginary edge line Lc. In this situation, since the imaginary edge line Lc is drawn on the center of the lane 23, the vehicle 2 has already passed over the edge line, and the actual steering angle δ exceeds the right limit steering angle Rδmax. Therefore, the assist torque corresponding to the difference between the actual steering angle δ and the right limit steering angle Rδmax calculated based on the imaginary edge line Lc is applied to the steering wheel 4 in the direction to return the vehicle 2 to the center of the lane 23. In this case, specifically, the actual steering angle δ is smaller than the right limit steering angle Rδmax (δ<Rδmax, that is, larger in the negative direction). Therefore, the above-explained assist torque Rτ (=K(Rδmax−δ)) is calculated. In this situation, the above-mentioned relationship (Lδmax<δ) is not satisfied between the actual steering angle δ and the left limit steering angle Lδmax. Therefore, the assist torque Lτ (=K(Lδmax−δ)) in the opposite direction is not calculated. Likewise, when the vehicle 2 is oriented to the left with respect to the imaginary edge line Lc, the assist torque is calculated in the same manner as described above. In FIG. 8, the assist control starting positions 26 and 27 are indicated as the rotational angle of the steering wheel 4, and both sides of the neutral position at which the rotational angle of the steering wheel 4 is zero correspond to the execution regions 29 and 30, respectively.

Therefore, when the steering wheel 4 is rotated in any direction, the steering reaction force is applied immediately to the steering wheel 4 in a direction to maintain the vehicle 2 to the center of the lane 23. That is, the steering reaction force is applied to the steering wheel 4 from both of the left and right directions so as to maintain the steering wheel 4 to the neutral position. Therefore, even if the vehicle 2 meanders temporarily as indicated by the wavy line in FIG. 8, the steering wheel 4 is maintained to the neutral position, and the vehicle 2 travels along the imaginary edge line Lc drawn on the center of the lane 23. As a result, the control hunting due to the generation of the steering reaction force alternately from left and right is avoided.

Figure 9C:
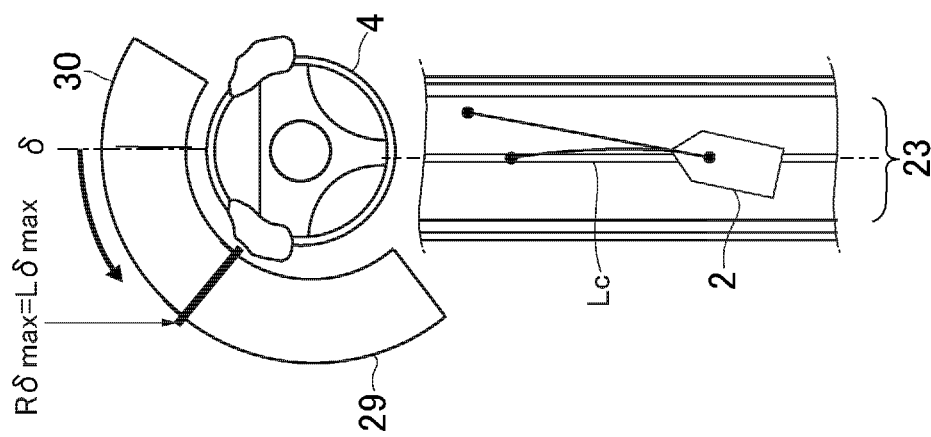
FIGS. 9A, 9B, and 9C are illustrations for explaining a relation between the actual steering angle and the limit steering angle in the situation where the imaginary edge line is set.

Here will be explained the relation between the actual steering angle δ and the limit steering angle δmax in the situation where the vehicle 2 is turned in any direction from the imaginary edge line Lc drawn on the center of the lane 23. FIG. 9A shows a situation in which the vehicle 2 is traveling on the imaginary edge line Lc within the lane 23. In this situation, the vehicle 2 is positioned on the imaginary edge line Lc, and the direction of the vehicle 2 coincides with the extending direction of the imaginary edge line Lc. Therefore, the limit steering angle δmax is "0 degree", and the actual steering angle δ is also "0 degree" to travel straight ahead. Since there is no difference between the actual steering angle δ and the limit steering angle δmax, the assist torque τ is not calculated, and the steering reaction force is not established.

Figure 9B:
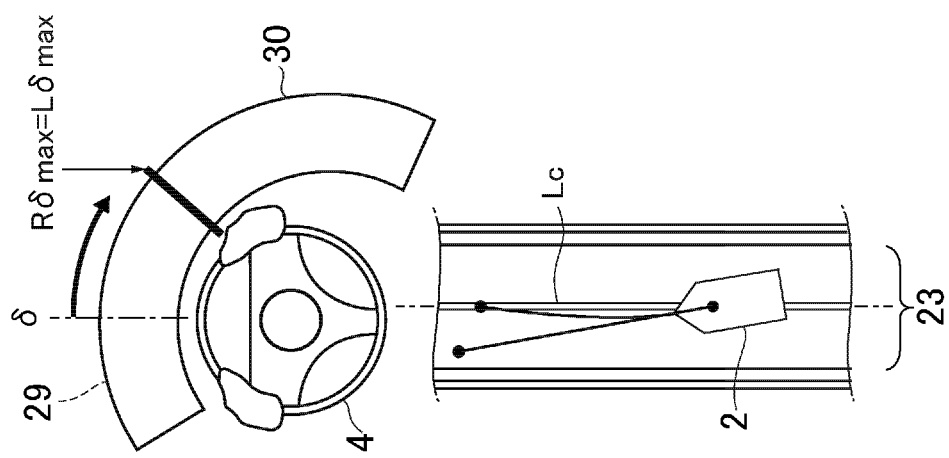
Figure 9A:
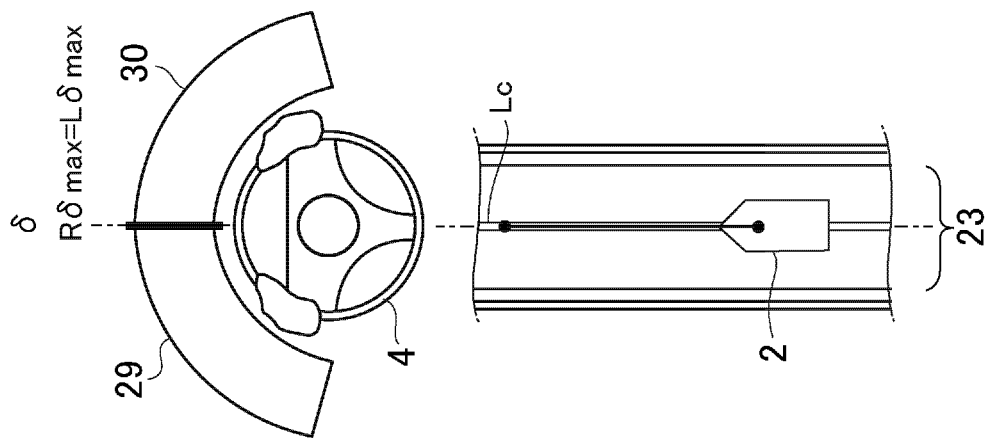

FIG. 9B shows a situation in which the vehicle 2 traveling on the imaginary edge line Lc is oriented to the left at a predetermined angle. In this situation, the vehicle 2 is still positioned on the imaginary edge line Lc, and the actual steering angle δ is "0 degree". However, if the vehicle 2 continues to travel while maintaining the steering wheel 4 to the current position, the vehicle 2 will eventually deviate from the imaginary edge line Lc. Therefore, the steering angle at which the vehicle 2 returns to the imaginary edge line Lc in the predetermined read-ahead time t is calculated as the limit steering angle δmax. In the example shown in FIG. 9B, the limit steering angle δmax is set to a rightward angle from the reference steering position So of the steering wheel 4. In this situation, since the actual steering angle δ is larger than the limit steering angle δmax, the assist torque Lτ (=K(Lδmax−δ)) calculated in accordance with the difference between the actual steering angle δ and the limit steering angle δmax is applied to the steering wheel 4.

FIG. 9C shows a situation in which the vehicle 2 traveling on the imaginary edge line Lc is oriented to the right by a predetermined angle. In this situation, the vehicle 2 is still positioned on the imaginary edge line Lc, and the actual steering angle δ is "0 degree". However, if the vehicle 2 continues to travel while maintaining the steering wheel 4 to the current position, the vehicle 2 will eventually deviate from the imaginary edge line Lc. Therefore, the steering angle at which the vehicle 2 returns to the imaginary edge line Lc in the predetermined read-ahead time t is calculated as the limit steering angle δmax. In the example shown in FIG. 9C, the limit steering angle δmax is set to a leftward angle from the reference steering position So. In this situation, since the actual steering angle δ is smaller than the limit steering angle δmax, the assist torque Rτ (=K(Rδmax−δ)) calculated in accordance with the difference between the actual steering angle δ and the limit steering angle δmax is applied to the steering wheel 4.

Figure 10A:
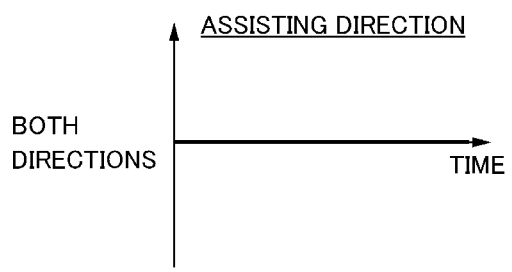
FIG. 10A is a graph schematically showing the direction, the limit steering angle, and the assist torque of the steering assist control in a case that the limit steering angle is adjusted.

FIG. 10A shows the assisting direction, the limit steering angle δmax and the deviation Δδ between the limit steering angle δmax and the actual steering angle δ, and the steering reaction force (assist torque) τ, in the case that the limit steering angle δmax is adjusted during propulsion on the narrow road. If the road on which the vehicle 2 is traveling is straight, the assist control starting positions 26 and 27 are set based on the neutral position of the steering wheel 4, and the limit steering angle δmax is set to zero degree. Therefore, the operation of the steering wheel 4 is assisted from both of the left and right directions at the position where the rotational angle of the steering wheel 4 is zero degree. Further, the right limit steering angle Rδmax and the left limit steering angle Lδmax returning to the imaginary edge line Lc in a predetermined read-ahead time are obtained based on the imaginary edge line Lc. As explained with reference to FIGS. 9A, 9B, and 9C, the limit steering angle δmax is set to "0 degree" as long as the vehicle 2 travels along the imaginary edge line Lc in the lane 23 in the extending direction of the imaginary edge line Lc, and the limit steering angle δmax is set to a predetermined angle in other circumstances. Specifically, when the vehicle 2 deviates from the center of the lane 23, the steering reaction force is generated in accordance with the difference between the actual steering angle δ and the limit steering angle δmax, in a direction to return or maintain the vehicle 2 to the center of the lane 23. As a result, the deviation Δδ between the actual steering angle δ and the limit steering angle δmax is reduced gradually, and eventually reduced to zero. Likewise, the assist torque τ also converges to zero.

Figure 10B:
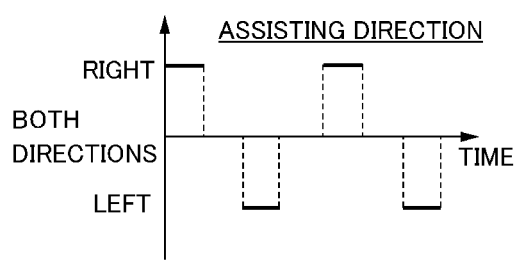
FIG. 10B is a graph schematically showing the direction, the limit steering angle, and the assist torque of the steering assist control in a case that the limit steering angle is not adjusted.
Figure 10B:
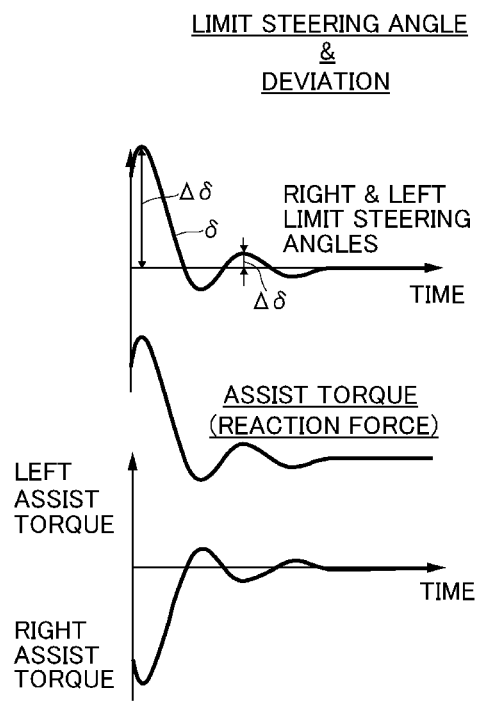
Figure 10B:
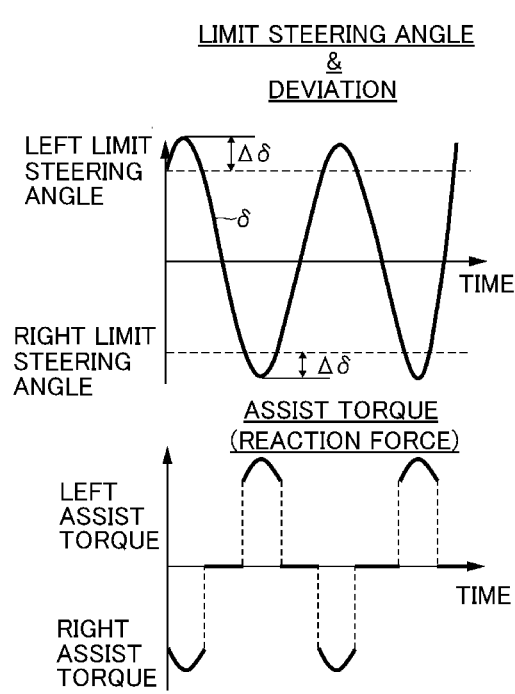

FIG. 10B shows the assistance direction, the limit steering angle δmax and the deviation Δδ between the limit steering angle δmax and the actual steering angle δ, and the steering reaction force (assist torque), in the case that the limit steering angle δmax is not adjusted. In this case, the assist control starting positions 26 and 27 are drawn apart from each other across the ineffective region 28, and the left limit steering angle Lδmax and the right limit steering angle Rδmax are set respectively. Therefore, when the vehicle 2 is traveling in the left side of the lane 23, the steering assistance control is executed to return the vehicle 2 to the right, and when the vehicle 2 is traveling on the right side of the lane 23, the steering assistance control is executed to return the vehicle 2 to the left. Specifically, when the actual steering angle δ deviates from the limit steering angle δmax by rotating the steering wheel 4 in any direction to return the vehicle 2 to the center of the lane 23, the steering assistance control is executed. In this situation, the assist torque τ is generated until the deviation Δδ between the actual steering angle δ and the limit steering angle δmax is eliminated. As a result, when the vehicle 2 returns to the center of the lane 23 but the steering wheel 4 is still rotated, the actual steering angle δ deviates from the limit steering angle δmax in the opposite direction, and the steering assistance is executed again. Thus, in the narrow road, the steering assistance control is executed by a slight change in the actual steering angle δ, and hence the steering wheel 4 is repeatedly reciprocated by the steering reaction force. That is, the control hunting occurs.

Figure 11:
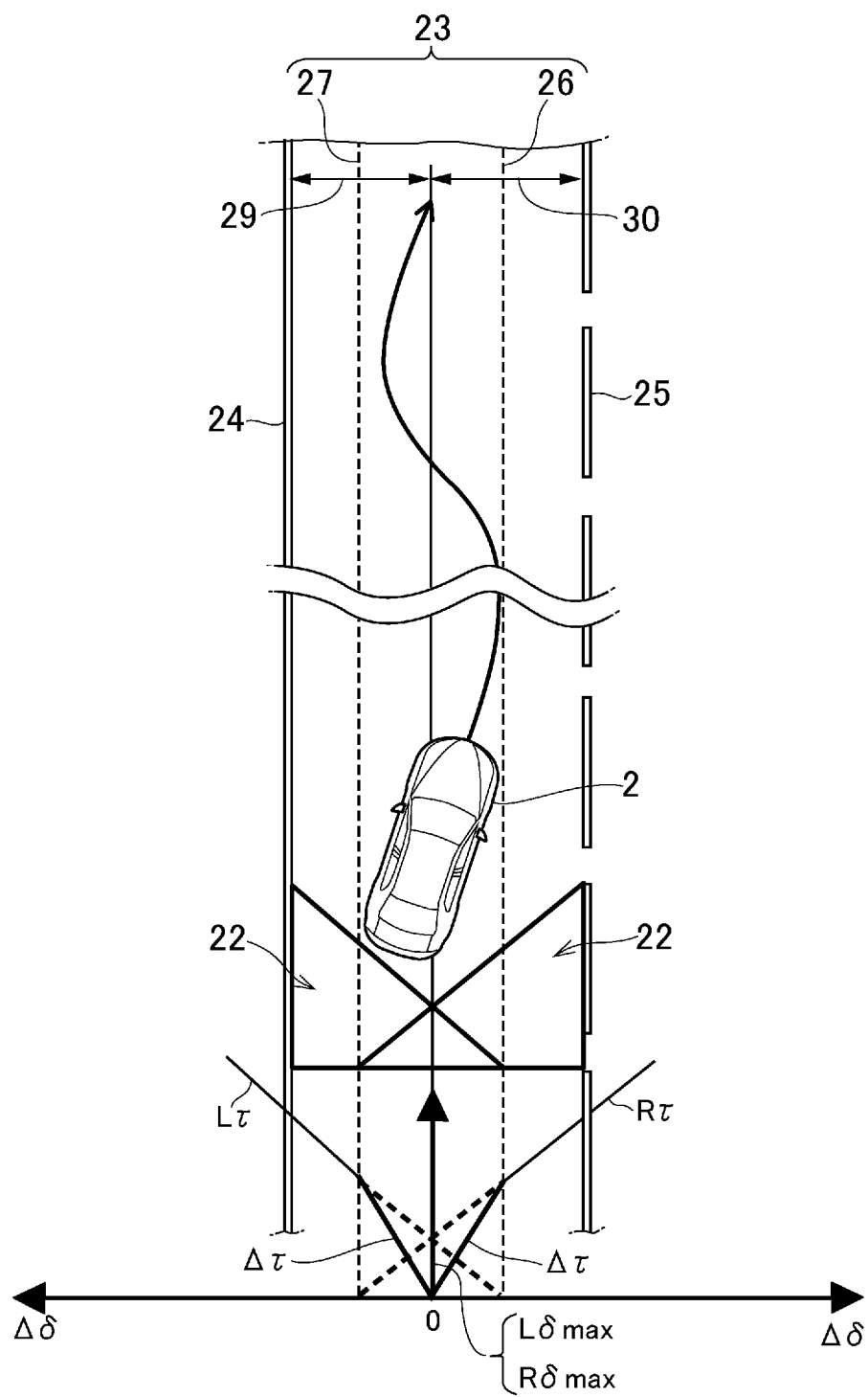
FIG. 11 is an illustration showing the assist torque of a case in which the left and right execution regions partially overlap on each other.

According to the embodiment of the present disclosure, the limit steering angle can be adjusted even if the left execution region 29 and the right execution region 30 partially overlap each other and the ineffective region 28 is eliminated in a narrow road. In the example illustrated in FIG. 11, the left assist control starting position 26 is located on the right side of the center portion of the lane 23, the right assist control starting position 27 is located on the left side of the center portion of the lane 23, and the left execution region 29 and the right execution region 30 partially overlap on each other. In this situation, even if the vehicle 2 travels along the center of the lane 23, the vehicle 2 is positioned in the left execution region 29 and the right execution region 30. Therefore, the steering reaction force acts on the steering wheel 4 in both of the left and right directions. Since the directions of the steering reaction forces are opposite to each other, specifically, the steering reaction force corresponding to a difference between the left and right steering reaction forces is applied to the steering wheel 4. In FIG. 11, there is shown a diagram indicating the left and right steering reaction forces (assist torques) Lτ and Rτ, and a difference Δτ therebetween.

As can be seen from the diagram, in the situation where the vehicle 2 is positioned at the center of the lane 23 and the actual steering angle δ is zero, the magnitudes of the steering reaction forces Lτ and Rτ applied to the steering wheel 4 from opposite directions i.e., from the right side and the left side are identical to each other. That is, the steering reaction forces cancel each other out to be zero. Thereafter, when the actual steering angle δ increases by rotating the steering wheel 4, the steering reaction force corresponding to the difference Δτ between the assist torques Lτ and Rτ is applied to the steering wheel 4. Thus, the difference Δτ between the assist torques Lτ and Rτ actually acts as the steering reaction force on the steering wheel 4. Specifically, a rate of change of the difference Δτ (i.e., an amount of change in the difference Δτ with respect to an amount of change in the deviation Δδ of the steering angles) in the region where the execution regions 29 and 30 overlap each other is larger than a rate of change in the difference Δτ in the region where the execution regions 29 and 30 do not overlap each other. That is, in the case where the execution regions 29 and 30 overlap each other in the narrow road, the assist torque τ changes stepwise, and the position or timing at which the rate of change of the assist torque τ changes varies depending on the traveling condition such as the width of the lane and the vehicle speed. Therefore, the driver may feel uncomfortable feeling about the steering assist control.

Figure 12:
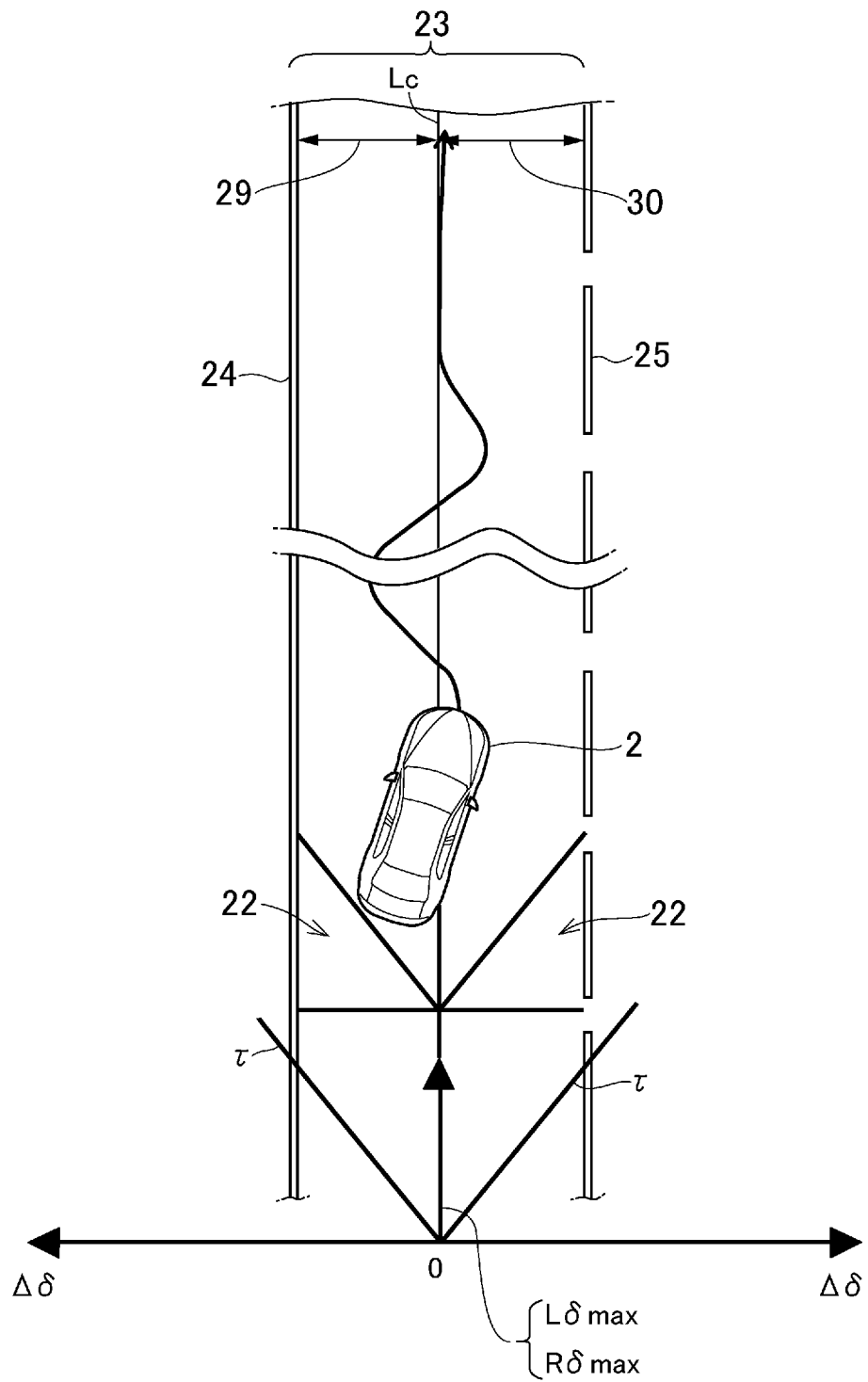
FIG. 12 is an illustration showing the assist torque of a case in which the left and right execution regions partially overlap on each other, and the limit steering angle is adjusted.

In order to solve such disadvantage, the limit steering angle δmax is adjusted by setting the imaginary edge line Lc upon satisfaction of the condition shown in FIG. 11, that is, when the right limit steering angle is changed to an angle in the direction to turn the vehicle 2 to the left and the left limit steering angle is changed to an angle in the direction to turn the vehicle 2 to the right, while the vehicle 2 travels in the center of the lane. In this case, the assist torque τ changes as indicated in FIG. 12. Specifically, in the example shown in FIG. 12, the assist control starting positions 26 and 27 set on both sides of the vehicle 2 are set at the same position on the center of the lane 23, and the left and right limit steering angles Lδmax and Rδmax are equalized to each other. As a result, the left execution region 29 is set on the left side of the center of the lane 23, and the right execution region 30 is set on the right side of the center of the lane 23. In other words, the overlap of the execution regions 29 and 30 is cancelled. This is the same situation as the above-explained situation shown in FIG. 8 so that the hunting of the assist control can be avoided, and in addition, the assist torque can be prevented from being changed stepwise.

Note that the present disclosure should not be limited to the above-described embodiments. For example, the above-described steering assist control may also be executed when the vehicle 2 travels on a curved road. In the case that the vehicle 2 travels on a curved road, a position of the steering wheel 4 at which the vehicle 2 travels along the center of the lane in accordance with a curvature of the lane is set as the reference steering position, and the right and left limit steering angles are set on both sides of the reference steering position. Further, a steering stick may also be adopted as the operation unit instead of the steering wheel. In this case, since the steering stick is not rotated but tilted to the left and right, the actual tilt angle of the steering stick corresponds to the actual steering angle of the steering wheel 4, and the limit tilt angle of the steering stick is calculated in the same manner as described above. Therefore, the steering angle according to the present disclosure includes an angle of inclination. Furthermore, in the foregoing embodiment, the steering angle in the left direction is described as a "positive" angle and the steering angle in the right direction is described as a "negative" angle, but definitions of those expressions "positive" and "negative" may be opposite to the above-described embodiment, and an absolute value of the steering angle may be adopted without dividing the steering angle into "positive" and "negative".

What is claimed is:

1. A driver assist system for a vehicle that assists a driver to steer the vehicle so as to prevent deviation of the vehicle from a predetermined lane, comprising:
   a controller that controls a steering force,
   wherein the controller comprises:
   an edge line detector that detects a right edge line and a left edge line of the predetermined lane on which the vehicle travels;
   a limit steering angle detector that detects a right limit steering angle at which the vehicle reaches the right edge line in a predetermined time given that the vehicle travels at a current speed, and a left limit steering angle at which the vehicle reaches the left edge line in the predetermined time given that the vehicle travels at the current speed;

an actual steering angle detector that detects an actual steering angle as an operating amount from a position at which the vehicle propels straight ahead;

a comparator that compares the actual steering angle with the right limit steering angle and the left limit steering angle;

a steering assistor that establishes a steering reaction force when the actual steering angle exceeds the right limit steering angle or the left limit steering angle, in a direction to reduce a difference between the actual steering angle and the right limit steering angle or the left limit steering angle exceeded by the actual steering angle;

a determiner that determines a satisfaction of a predetermined condition relating to a width of the predetermined lane; and an adjustor that imaginarily sets the right edge line and the left edge line on a center of the predetermined lane in a width direction, and calculate the right limit steering angle and the left limit steering angle based on the right edge line and the left edge line set imaginarily so as to establish the steering reaction force by the steering assistor, when the satisfaction of the predetermined condition is determined by the determiner.

2. The driver assist system for the vehicle as claimed in claim 1, wherein the predetermined condition includes any of:

a fact that a deviation between the right limit steering angle and the left limit steering angle is equal to or less than a predetermined threshold value; and a fact that the width of the predetermined lane on which the vehicle travels is narrower than a predetermined width.

3. The driver assist system for the vehicle as claimed in claim 1, further comprising:

a steering device that is operated to turn the vehicle, wherein a position of the steering device at which the vehicle propels straight ahead corresponds to zero degree, an operating amount of the steering device in a direction to turn the vehicle in one of a right direction and a left direction is expressed as a positive amount, the operating amount of the steering device in a direction to turn the vehicle in other one of the right direction and the left direction is expressed as a negative amount, and the actual steering angle, the right limit steering angle, and the left limit steering angle correspond to the operating amount of the steering device.

4. The driver assist system for the vehicle as claimed in claim 2, further comprising:

a steering device that is operated to turn the vehicle, wherein a position of the steering device at which the vehicle propels straight ahead corresponds to zero degree, an operating amount of the steering device in a direction to turn the vehicle in one of a right direction and a left direction is expressed as a positive amount, the operating amount of the steering device in a direction to turn the vehicle in other one of the right direction and the left direction is expressed as a negative amount, and the actual steering angle, the right limit steering angle, and the left limit steering angle correspond to the operating amount of the steering device.

5. The driver assist system for the vehicle as claimed in claim 1, wherein the steering assistor is configured to establish the steering reaction force corresponding to an excess amount of the actual steering angle over the right limit steering angle or the left limit steering angle.

6. The driver assist system for the vehicle as claimed in claim 2, wherein the steering assistor is configured to establish the steering reaction force corresponding to an excess amount of the actual steering angle over the right limit steering angle or the left limit steering angle.

7. The driver assist system for the vehicle as claimed in claim 1, wherein the determiner is configured to determine the satisfaction of the predetermined condition when the right limit steering angle is changed to an angle to turn the vehicle in the left direction while the vehicle travels on the center of the predetermined lane in an extending direction of the predetermined lane, and when the left limit steering angle is changed to an angle to turn the vehicle in the right direction while the vehicle travels on the center of the predetermined lane in the extending direction of the predetermined lane.

8. The driver assist system for the vehicle as claimed in claim 2, wherein the determiner is configured to determine the satisfaction of the predetermined condition when the right limit steering angle is changed to an angle to turn the vehicle in the left direction while the vehicle travels on the center of the predetermined lane in an extending direction of the predetermined lane, and when the left limit steering angle is changed to an angle to turn the vehicle in the right direction while the vehicle travels on the center of the predetermined lane in the extending direction of the predetermined lane.

* * * * *